United States Patent
Silver

[19]

[11] Patent Number: 5,988,108
[45] Date of Patent: Nov. 23, 1999

[54] FELINE LITTER BOX

[76] Inventor: Dean Silver, 37, 9619-180 Street, Edmonton, Alberta, Canada, T5T 4L9

[21] Appl. No.: 08/997,336

[22] Filed: Dec. 24, 1997

[51] Int. Cl.$^6$ ..................................................... A01K 29/00
[52] U.S. Cl. ............................................................... 119/166
[58] Field of Search .................................... 119/165, 166, 119/170; 96/57, 135, 136, 153

[56] References Cited

U.S. PATENT DOCUMENTS

| | | | |
|---|---|---|---|
| 4,164,901 | 8/1979 | Everett | 96/57 |
| 4,244,710 | 1/1981 | Burger | 96/57 |
| 4,630,530 | 12/1986 | Eckstrom et al. | 96/57 |
| 4,784,675 | 11/1988 | Leber et al. | 96/135 |
| 5,140,948 | 8/1992 | Roberts | 119/165 |
| 5,201,860 | 4/1993 | Richardson | 47/39 |
| 5,478,379 | 12/1995 | Bevins | 96/135 |
| 5,655,478 | 8/1997 | Kiera | 119/165 |
| 5,738,040 | 4/1998 | Simmons | 119/165 |
| 5,778,822 | 7/1998 | Giffin et al. | 119/165 |

*Primary Examiner*—Robert P. Swiatek
*Assistant Examiner*—Elizabeth Shaw
*Attorney, Agent, or Firm*—Terry M Gernstein

[57] ABSTRACT

There is provided a ventilation assembly unit for a feline litter box. The unit comprises a housing containing a fan at the base thereof. A filtering medium is contained in a canister adapted for removal and insertion within the housing. The filtering medium comprises, in combination, an air dispersing mesh covered with a layer of particulate carbon.

9 Claims, 4 Drawing Sheets

FELINE LITTER BOX

FIELD OF THE INVENTION

The present invention relates to an improved litter box for felines.

BACKGROUND OF THE INVENTION

Feline litter boxes currently available commercially generally comprise an integral unit formed of a plastic material, which defines an entry for the animal. Typically, an aperture is formed on the top wall of said box, said aperture being adapted to receive a filter element exemplary of which is a charcoal impregnated mesh or the like.

Deleteriously, the present litter boxes are considered to not effectively dispose of the odour generated therein despite the provision of the filtering element described supra.

SUMMARY OF THE INVENTION

It is a primary objective of the present invention to provide an improved feline litter box, which is functional not only to effectively dispose of the contaminated air accruing therein, but also to clean the air to such a degree whereby it is essentially odourless. Furthermore, the ventilation assembly unit, an adjunct to commercially available litter boxes, will function for extended periods of time without the requirement of maintenance.

Broadly stated the invention is an improvement to a feline litter box provided with a ventilation assembly unit which comprises, in combination: a housing; an air intake port positioned at the base of said housing, said port being functional to receive contaminated air from said litter box; a fan member positioned above said intake port and being functional to blow said contaminated air in a desired direction at a predetermined rate; a filtering medium contained in a canister, said canister being releasable from said housing and being positioned whereby the air from said fan passes therethrough; a intermediate air intake port positioned between said fan and said filtering medium to direct air therethrough; and an exhaust port for venting the substantially odourless air after passage through said filtering medium into the atmosphere.

Advantageously, the present invention is relatively quiet and easy to maintain, the filtering element requiring replacement only approximately once a year.

DESCRIPTION OF THE DRAWINGS

The invention will be better understood having reference to the accompanying drawings and the description given herebelow.

DESCRIPTION OF THE PREFERRED EMBODIMENT

Figure 1:
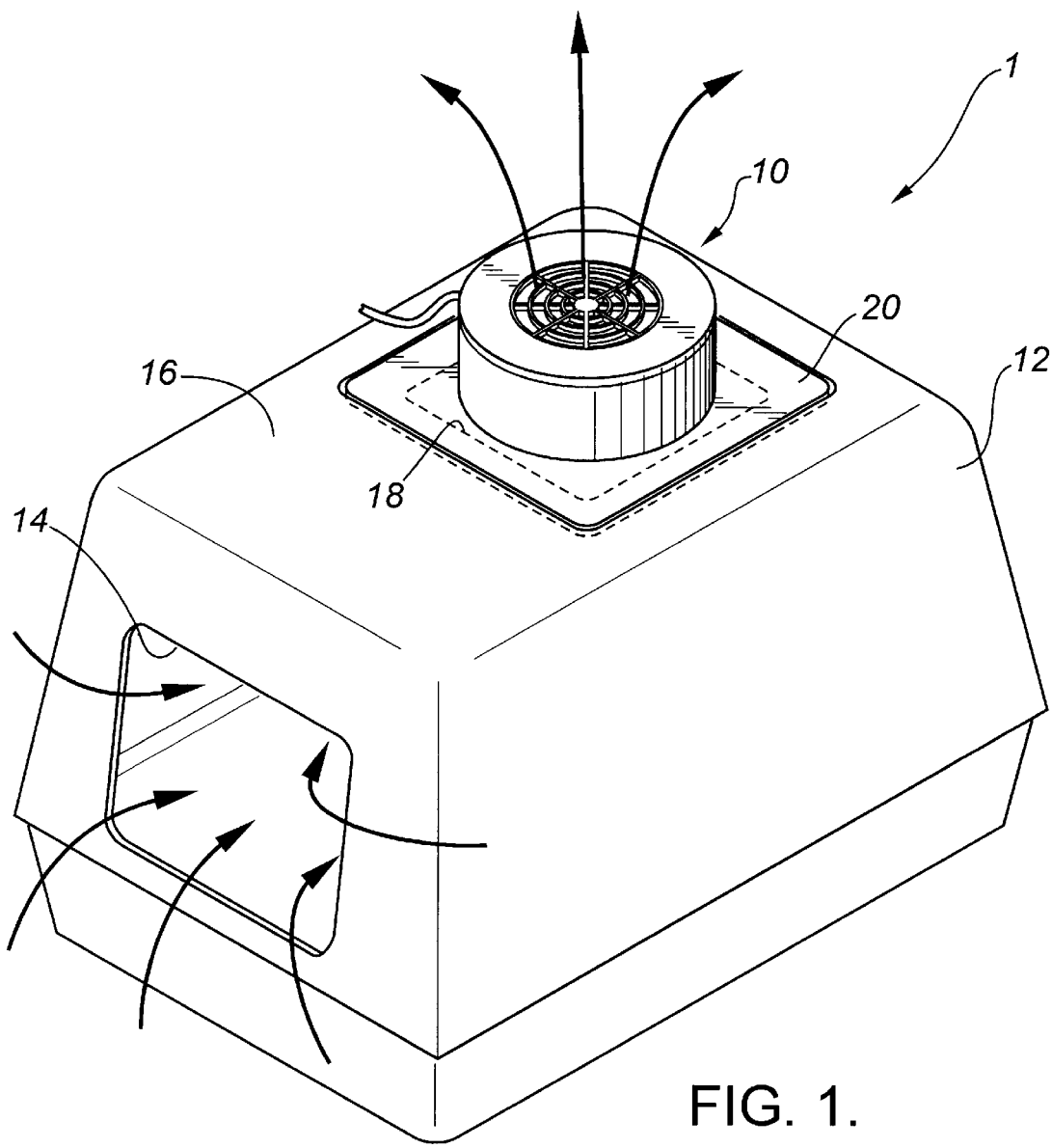
FIG. 1 is a perspective view of the ventilated litter box of the present invention.

Having reference to the accompanying drawings, there is shown the ventilated litter box 1 of the instant invention. Litter box 1 defines the ventilation assembly unit 10 and a conventional litter box 12 per se. A feline entry 14 is formed in litter box 12. The ventilation assembly unit 10, which comprises the improvement to the present invention, is adapted to be sealingly fitted into an aperture 18 defined in the top wall 16 of litter box 12. However, it is to be understood that whilst the present ventilation unit is utilized in the context described herein, the unit may well find other similar venting applications.

Figure 2:
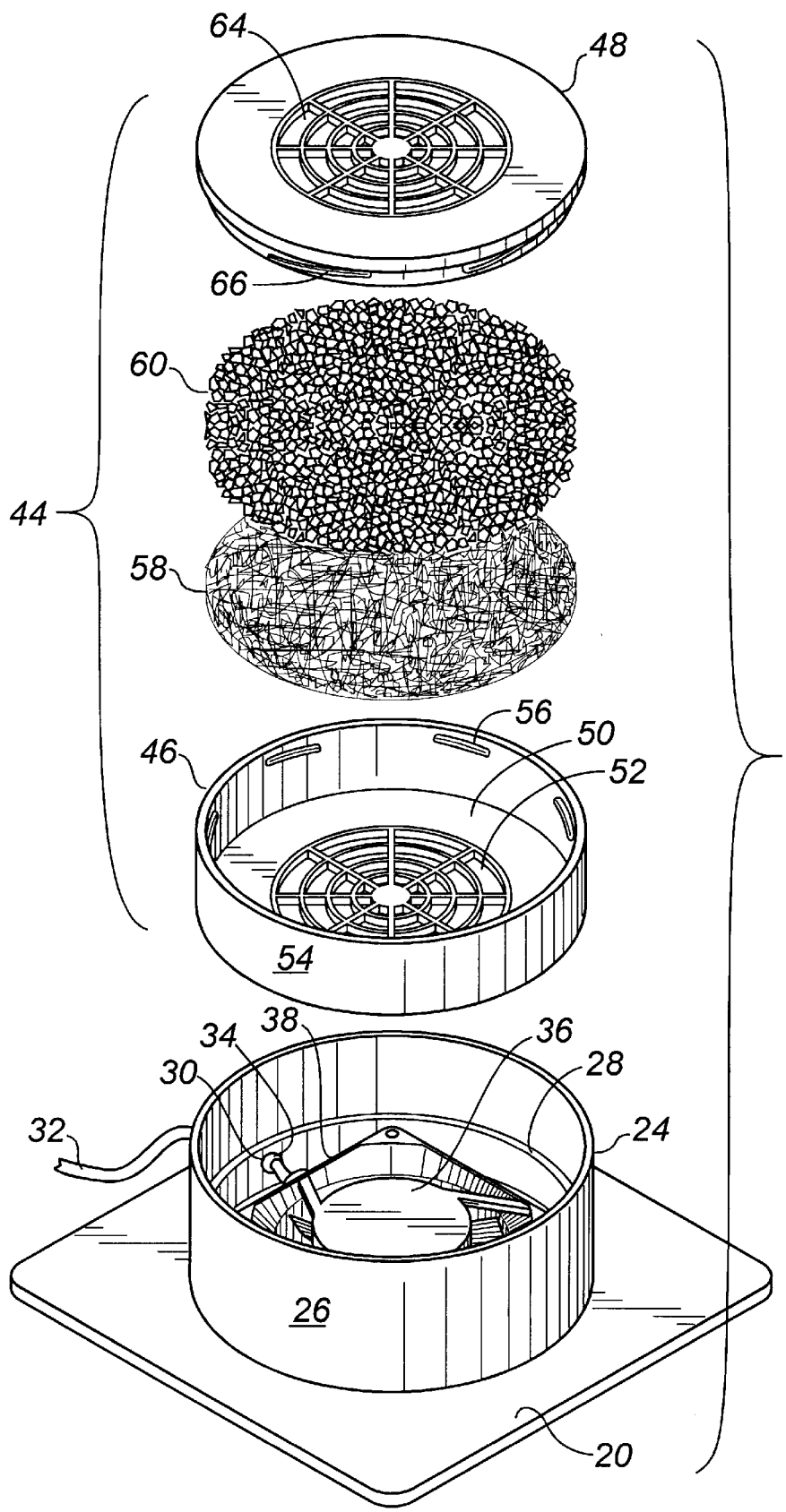
FIG. 2 is an exploded view of the components of the ventilation assembly unit provided for the litter box of FIG. 1.
Figure 3:
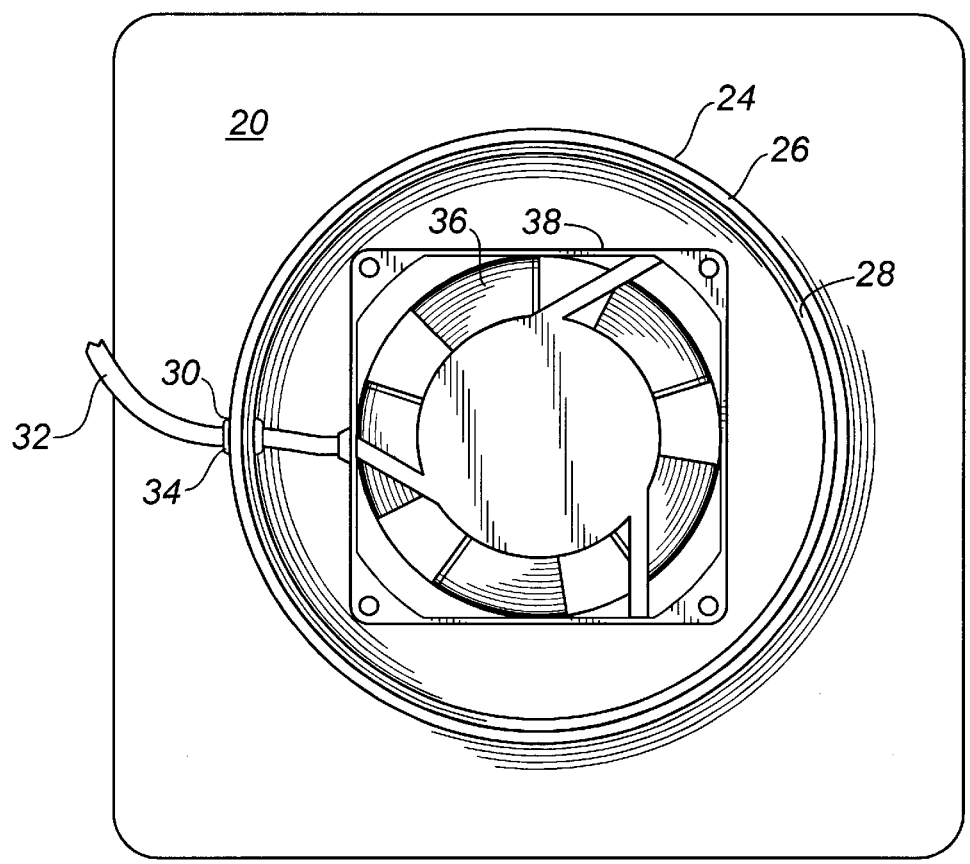
FIG. 3 is a plan view of the ventilation assembly unit of FIG. 2.
Figure 4:
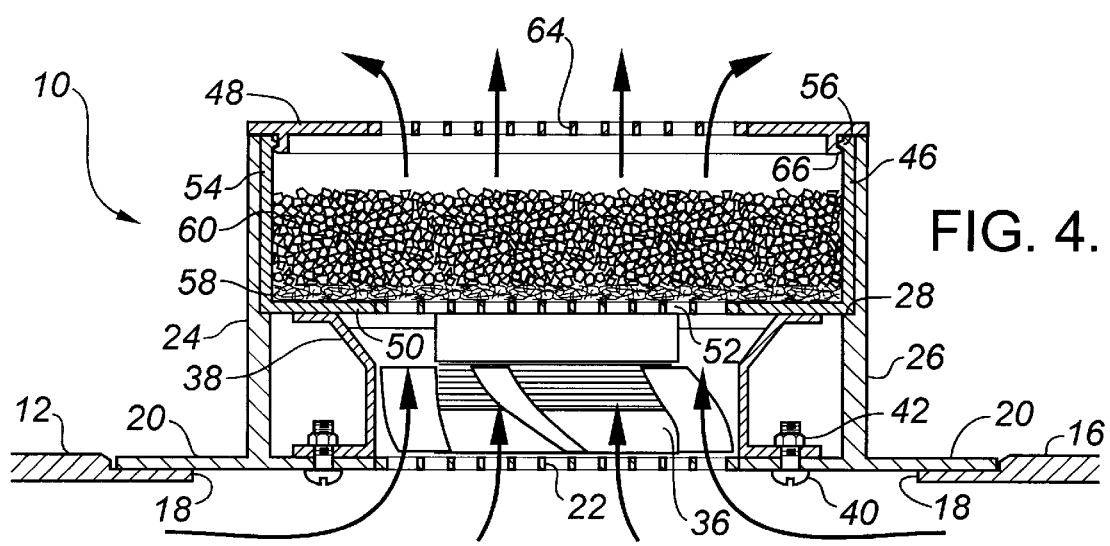
FIG. 4 is a side-sectional view of the ventilation assembly unit of FIG. 2.
Figure 5:
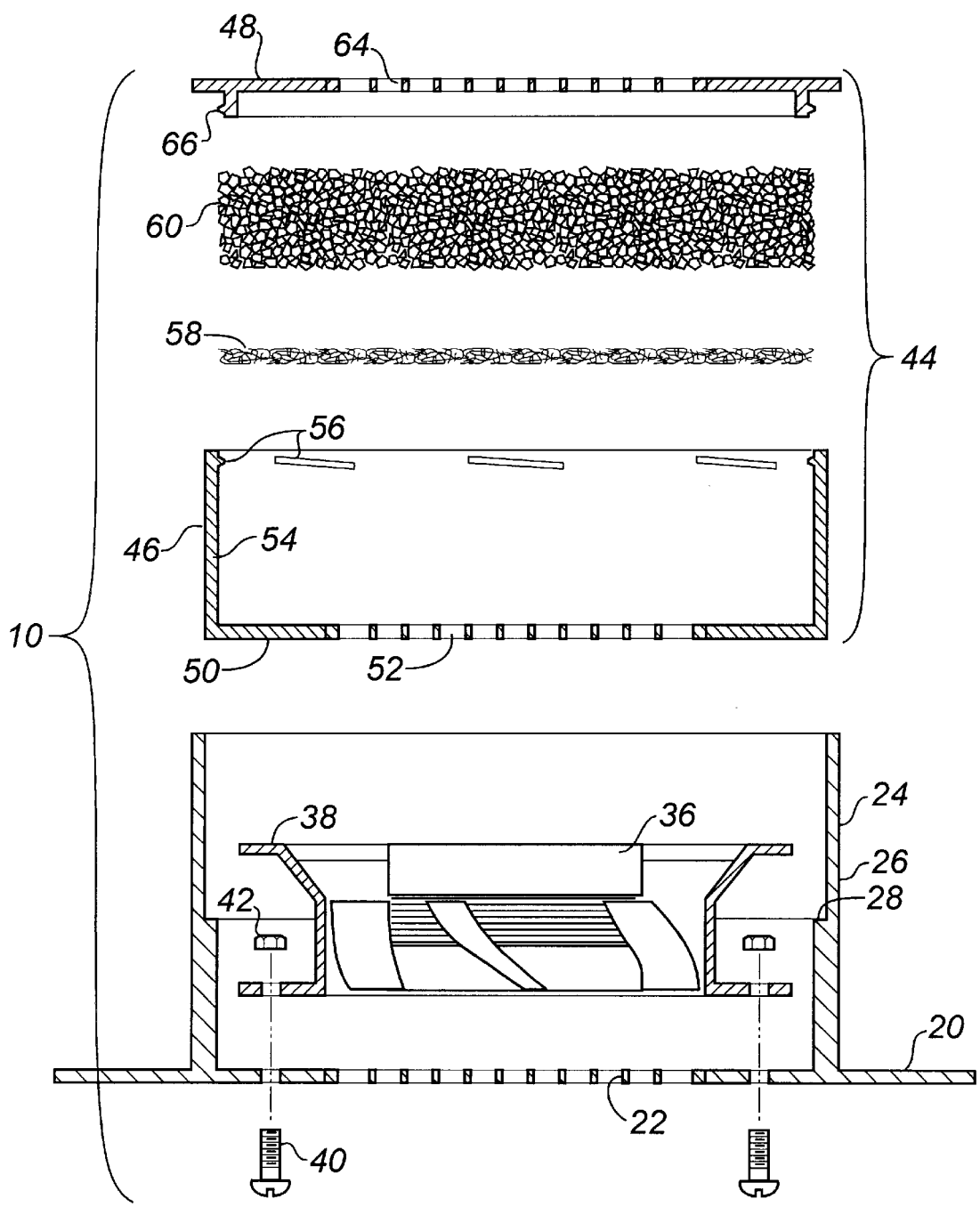
FIG. 5 is an exploded view of FIG. 4.

With particular reference to FIGS. 2–5, the ventilation unit 10 comprises a generally circular housing 24 adapted to receive, in sealing engagement therewith a removable canister 44.

The circular housing 24, in which is positioned a fan 36, forms a base plate 20 which, in this embodiment, is rectangular so as to fit into the aperture 18 in sealing engagement therewith. The base plate 20 defines a circular intake port 22 for intake of contaminated air from the litter box 12 therein. Defined in the walls 26 of housing 24 is a circular shoulder 28 for purposes to be explained hereinafter. An aperture 30 is provide through which the cord 32 of fan 36 passes. Aperture 30 is provided with a seal 34.

The fan 36, which may be like model A31-B15A-15W2, 000 (115 Vac, 50/60 Hz 5/4.5 W) manufactured by TRW, is positioned within a fan support structure 38 and secured to base plate 20 by means of bolts 40 and nuts 42.

The removable canister 44 is functional to contain the filtering medium and when inserted into housing 24 rests snugly on shoulder 28 formed therein.

The canister 44 comprises a lower section 46 having a lid 48 threadable thereon.

The lower section 46 forms a base plate 50, in which is provided an intermediate air intake port 52 which port receives contaminated air directed thereto by fan 36. The side wall 54 of section 46 forms at its upper inner circumference, threads 56.

The filtering medium comprises, in combination a mesh 58, made of material such as nylon padding, which in this embodiment has a thickness layer of about ½ inch, and particulate carbon 60 thereabove. The preferred particle size of the carbon is about ⅛ inches in diameter, it having been determined that for example fine particles of activated charcoal are impractical and larger particles are ineffective. The mesh 58 porosity would be such as to retain the carbon particles from falling therethrough. Essentially the mesh contains the carbon particles within the canister, however other means may be utilized to prevent the particles from entering the lower section of the housing.

The lid 48 is adapted to threadedly engage section 46. The lid 48 is provided with a circular odour-free air exhaust port 64 and is further provided with a lower threaded flange 66 adapted to engage threads 56. Clearly, the air 22 intake port, central port 52 and exhaust port 64 will have identical diameters.

It will be evident to one skilled in the art that the fan size, mesh thickness and layer thickness of particulate carbon in the filtering medium relative to one another will depend upon the specific application of the ventilation unit and the requisite size thereof but will need to be experimentally determined in order to prevent occurrence of any downdraft.

The embodiments in which an exclusive property or privilege are claimed are defined as follows:

1. A ventilation assembly unit adapted for use with an unsealed housing comprising, in combination:

a housing;

an air intake port positioned at a base of said housing, said port being functional to receive contaminated airflow therethrough;

a fan member positioned directly above said air intake port and immediately downstream therefrom and being functional to blow contaminated air from said airflow in an upward direction at a predetermined rate through said ventilation assembly unit;

a filtering medium contained in a canister, said canister being insertable in sealing engagement within said housing and releasable therefrom and being positioned above and immediately downstream of said fan whereby air from said fan passes therethrough;

means for retaining said filtering medium within said canister;

an intermediate air intake port positioned immediately upstream of said fan and fluidically between said fan and said filtering medium to direct air therethrough;

an exhaust port at the top of said canister for venting substantially odourless air after passage through said filtering medium into the atmosphere;

said air intake port, said fan member, said intermediate intake port, said means for retaining said filtering medium within said canister, said filtering medium, and said exhaust port being superimposed and in coaxial and fluidic downstream alignment one with another so that fan downstream pressure is applied directly to the interior of said housing and contaminated air drawn from within said housing to which said ventilation assembly unit is attached is filtered and is exhausted as substantially odourless air.

2. The assembly as set forth in claim 1 wherein said filtering medium comprises particulate carbon in combination with an air dispersion mesh.

3. The filtering medium as set forth in claim 1 wherein said carbon particle size ranges between about ¼ to ⅛ inches in diameter.

4. The filtering medium as set forth in claim 1 wherein said mesh is between about ¾ to ¼ inch thick and is positioned upstream of said carbon particles and wherein said carbon particle size ranges between about ¼ to ⅛ inches in diameter.

5. A substantially enclosed feline litter box having an entry for a feline defined therein and an aperture on a top wall thereof comprising:

a ventilation assembly unit sealably mounted on the top wall of the litter box and which is adapted for use with an unsealed housing, said litter box having an interior;

a ventilation assembly housing having a base;

an air intake port positioned at the base of said housing, said air intake port receiving contaminated airflow from the litter box therethrough;

a fan member positioned directly above and immediately downstream of said air intake port and being directly fluidically connected to the interior of said litter box to blow said contaminated airflow from the interior of said litter box in an upward direction at a predetermined rate through said ventilation assembly unit;

a filtering medium contained in a canister, said canister being inserted in sealing engagement within said housing and releasable therefrom and being positioned above and immediately downstream of said fan whereby air from said fan passes directly thereto and therethrough;

means for retaining said filtering medium within said canister;

an intermediate air intake port positioned fluidically immediately between said fan and said filtering medium to direct air therethrough;

an exhaust port at a top of said canister for venting substantially odourless air after passage through said filtering medium into the atmosphere; and said air intake port, said fan member, said filtering medium, said means for retaining said filtering medium within said canister, said intermediate air intake port and said exhaust port being superimposed and in coaxial alignment one with another so that contaminated air drawn from within an unsealed housing to which said ventilation assembly unit is attached is filtered and is exhausted as substantially odourless air.

6. The feline litter box defined in claim 5 wherein said filtering medium comprises particulate carbon, said carbon having particles in a size range of between about ¼ inch to ⅛ inch in diameter and said means for retaining said filtering medium within said canister comprises a mesh between about ¾ inch to ¼ inch thick and is positioned immediately upstream of said filtering means.

7. The feline litter box defined in claim 5 wherein the air intake port and said exhaust port are substantially equal in outer peripheral dimension.

8. A feline litter box comprising:

a litter box housing having an entrance/egress opening in one wall thereof and a top wall;

a vent opening defined in said top wall through which air can flow from inside said litter box housing to outside said litter box housing;

a vent assembly mounted on said top wall in fluid communication with said vent opening and including a base plate mounted on said top wall and having an opening defined therein to be in fluid communication with said vent opening to receive air from said vent opening, a housing on said base plate and having an interior surface, a shoulder on the interior surface of said housing, a fan housing mounted at one end thereof on said base plate to encircle the opening in said base plate and having a second end thereof located adjacent to said shoulder, said fan housing being in fluid communication with the opening in said base plate, a canister removably positioned in said housing and having a base element resting on said shoulder and an intermediate air vent defined in said base element in position to be in fluid communication with the opening in said base plate, said canister further including a wall on said base element having an inside surface and a mounting thread on said inside surface, a mesh pad removably resting on said base element and covering said intermediate air vent, carbon particles loosely resting on said mesh pad and contained by the wall of said canister and said mesh pad and being located to be in fluid communication with said intermediate air vent, a lid connected to the wall of said canister to enclose said carbon particles within said canister, said lid including a thread which threadably connects to the thread on the wall of said canister and an exhaust port defined therein to be in fluid communication with said intermediate air vent via said carbon particles, and a fan mounted on said base element in said fan housing and having fan blades oriented and configured to move air from inside said litter box housing outwardly of said litter box housing through said exhaust port via said carbon particles with said fan being located upstream of said carbon particles whereby air from said litter box housing is moved into the environment surrounding the litter box housing after moving through said fan and from said fan to and through said carbon particles.

9. The feline litter box defined in claim 8 wherein said fan is immediately downstream of the vent opening in the top wall of said litter box housing, said intermediate air vent being immediately downstream of said fan, said mesh pad being immediately downstream of said intermediate air vent, said carbon particles being immediately downstream of said mesh pad and said exhaust port being immediately downstream of said carbon particles, all with respect to an air flow direction from inside said litter box housing to outside said exhaust port.

* * * * *